US008516230B2

(12) United States Patent
Chen et al.

(10) Patent No.: US 8,516,230 B2
(45) Date of Patent: Aug. 20, 2013

(54) SPE SOFTWARE INSTRUCTION CACHE

(75) Inventors: Tong Chen, Yorktown, NY (US); Brian Flachs, Austin, TX (US); Brad William Michael, Austin, TX (US); Mark Richard Nutter, Austin, TX (US); Kathryn M. O'Brien, Yorktown, NY (US); John Kevin Patrick O'Brien, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 12/648,741

(22) Filed: Dec. 29, 2009

(65) Prior Publication Data
US 2011/0161641 A1 Jun. 30, 2011

(51) Int. Cl.
*G06F 9/32* (2006.01)
(52) U.S. Cl.
USPC .......................................................... 712/233
(58) Field of Classification Search
USPC .......................................................... 712/233
See application file for complete search history.

(56) References Cited

U.S. PATENT DOCUMENTS

| | | | |
|---|---|---|---|
| 5,313,616 A | 5/1994 | Cline et al. | |
| 5,778,228 A | 7/1998 | Wei | |
| 5,926,632 A | 7/1999 | Kawaguchi | |
| 6,112,280 A * | 8/2000 | Shah et al. | 711/129 |
| 6,205,545 B1 * | 3/2001 | Shah et al. | 712/237 |
| 6,317,870 B1 | 11/2001 | Mattson, Jr. | |
| 6,330,556 B1 | 12/2001 | Chilimbi et al. | |
| 6,427,234 B1 | 7/2002 | Chambers et al. | |
| 6,453,411 B1 | 9/2002 | Hsu et al. | |
| 6,463,582 B1 | 10/2002 | Lethin et al. | |
| 6,481,008 B1 | 11/2002 | Chaiken et al. | |
| 6,598,221 B1 | 7/2003 | Pegatoquet et al. | |
| 6,609,248 B1 | 8/2003 | Srivastava et al. | |
| 6,622,300 B1 | 9/2003 | Krishnaswamy et al. | |
| 6,721,875 B1 | 4/2004 | McCormick, Jr. et al. | |
| 6,725,335 B2 * | 4/2004 | Bala et al. | 711/125 |
| 6,728,788 B1 | 4/2004 | Ainsworth et al. | |
| 6,795,964 B2 | 9/2004 | Ramasamy et al. | |

(Continued)

FOREIGN PATENT DOCUMENTS
WO WO 02/27498 4/2002

OTHER PUBLICATIONS

Lin, Charles. "Direct Mapped Cache". 3 pages, May 16, 2003. Obtained via http://www.cs.umd.edu/class/sum2003/cmsc311/Notes/.*
U.S. Appl. No. 12/823,194.

(Continued)

*Primary Examiner* — Robert Fennema
(74) *Attorney, Agent, or Firm* — Stephen J. Walder, Jr.; Matthew B. Talpis

(57) ABSTRACT

An application thread executes a direct branch instruction that is stored in an instruction cache line. Upon execution, the direct branch instruction branches to a branch descriptor that is also stored in the instruction cache line. The branch descriptor includes a trampoline branch instruction and a target instruction space address. Next, the trampoline branch instruction sends a branch descriptor pointer, which points to the branch descriptor, to an instruction cache manager. The instruction cache manager extracts the target instruction space address from the branch descriptor, and executes a target instruction corresponding to the target instruction space address. In one embodiment, the instruction cache manager generates a target local store address by masking off a portion of bits included in the target instruction space address. In turn, the application thread executes the target instruction located at the target local store address accordingly.

19 Claims, 9 Drawing Sheets

(56) References Cited

U.S. PATENT DOCUMENTS

| | | | |
|---|---|---|---|
| 6,817,014 | B2 | 11/2004 | Hundt et al. |
| 6,839,895 | B1 | 1/2005 | Ju et al. |
| 6,865,735 | B1 | 3/2005 | Sirer et al. |
| 6,934,943 | B2 | 8/2005 | Hundt et al. |
| 6,966,057 | B2 | 11/2005 | Lueh |
| 6,968,546 | B2 | 11/2005 | Lueh |
| 7,039,910 | B2 | 5/2006 | Kosche et al. |
| 7,526,502 | B2 | 4/2009 | Hall et al. |
| 7,526,760 | B1 | 4/2009 | Daynes et al. |
| 7,577,965 | B2 | 8/2009 | Tobin |
| 7,856,628 | B2 | 12/2010 | Li et al. |
| 2002/0144241 | A1 | 10/2002 | Lueh |
| 2002/0144245 | A1 | 10/2002 | Lueh |
| 2002/0194580 | A1 | 12/2002 | Ramasamy et al. |
| 2003/0009750 | A1 | 1/2003 | Hundt et al. |
| 2003/0079215 | A1 | 4/2003 | Hundt et al. |
| 2005/0108562 | A1 | 5/2005 | Khazan et al. |
| 2005/0155023 | A1 | 7/2005 | Li et al. |
| 2005/0246700 | A1 | 11/2005 | Archambault et al. |
| 2006/0059195 | A1 | 3/2006 | Hall et al. |
| 2006/0095895 | A1 | 5/2006 | K |
| 2007/0027877 | A1 | 2/2007 | Droshev et al. |
| 2007/0174819 | A1 | 7/2007 | Li et al. |
| 2008/0126771 | A1 | 5/2008 | Chen et al. ............... 712/238 |
| 2008/0282035 | A1 | 11/2008 | Hundt et al. |
| 2009/0307430 | A1* | 12/2009 | Bruening et al. ............ 711/119 |
| 2010/0306746 | A1 | 12/2010 | Barua et al. |
| 2011/0161641 | A1 | 6/2011 | Chen et al. |
| 2011/0320785 | A1 | 12/2011 | Chen et al. |
| 2011/0320786 | A1 | 12/2011 | Chen et al. |
| 2011/0321002 | A1 | 12/2011 | Chen et al. |
| 2011/0321021 | A1 | 12/2011 | Chen et al. |
| 2012/0198169 | A1 | 8/2012 | Chen et al. |
| 2012/0198170 | A1 | 8/2012 | Chen et al. |
| 2012/0198429 | A1 | 8/2012 | Chen et al. |
| 2012/0204016 | A1 | 8/2012 | Chen et al. |

OTHER PUBLICATIONS

U.S. Appl. No. 12/823,204.
U.S. Appl. No. 12/823,226.
U.S. Appl. No. 12/823,244.
U.S. Appl. No. 13/442,919.
U.S. Appl. No. 13/443,188.
U.S. Appl. No. 13/444,890.
U.S. Appl. No. 13/444,907.
Gilbert, John et al., "Adaptive Object Code Compression", CASES'06, Oct. 23-25, 2006, pp. 282-292.
Hazelwood, Kim et al. "A Dynamic Binary Instrumentation Engine for the ARM Architecture", CASES'06, Oct. 23-25, 2006, pp. 261-270.
Hu, Wei et al., "Secure and Practical Defense Against Code-injection Attacks using Software Dynamic Translation", VEE'06, Jun. 14-16, 2006, pp. 2-12.
Larus, James R. et al., "Rewriting Executable Files to Measure Program Behavior", Computer Sciences Department University of Wisconsin-Madison, Oct. 24, 1994, 23 pages.
Lu, Jiwei et al., "The Performance of Runtime Data Cache Prefetching in a Dynamic Optimization System", Proceedings of the 36th International Symposium on Microarchitecture (MICRO-36'03), IEEE, 2003, 11 pages. 2003.
Miller, Jason E. et al., "Software-based Instruction Caching for Embedded Processors", ACM, ASPLOS'06, Oct. 21-25, 2006, pp. 293-302. 2006 , 293-302.
Nanda, Susanta et al., "BIRD: Binary Interpretation using Runtime Disassembly", IEEE, Proceedings of the International Symposium on Code Generation and Optimization, 2006, 12 pages.
Noori, Hamid et al., "Enhancing Energy Efficiency of Processor-Based Embedded Systems through Post-Fabrication ISA Extension", ISLPED '08, Aug. 11-13, 2008, pp. 241-246.
Ramirez, Alex et al., "Software Trace Cache", ACM, International Conference on Supercomputing ICS'99, 1999, pp. 119-126.
Ramsey, Norman et al., "A Transformational Approach to Binary Translation of Delayed Branches", ACM Transactions on Programming Languages and Systems, vol. 25, No. 2, Mar. 2003, pp. 210-224.
Final Office Action dated Dec. 31, 2012 for U.S. Appl. No. 13/443,188; 17 pages.
Final Office Action mailed Jan. 3, 2013 for U.S. Appl. No. 12/823,204; 20 pages.
Office Action mailed Dec. 19, 2012 for U.S. Appl. No. 12/823,244; 26 pages.
Response to Office Action filed with the USPTO on Nov. 5, 2012 for U.S. Appl. No. 12/823,204, 17 pages.
Response to Office Action filed with the USPTO on Nov. 6, 2012 for U.S. Appl. No. 13/443,188, 15 pages.
Notice of Allowance mailed Apr. 18, 2013 for U.S. Appl. No. 12/823,204; 12 pages.
Office Action mailed Feb. 19, 2013 for U.S. Appl. No. 12/823,244; 22 pages.
Office Action mailed Feb. 26, 2013 for U.S. Appl. No. 12/823,194; 25 pages.
Office Action mailed Mar. 5, 2013 for U.S. Appl. No. 13/442,919; 19 pages.
Office Action mailed Apr. 9, 2013 for U.S. Appl. No. 12/823,226; 22 pages.
Response to Office Action filed with the USPTO on Apr. 1, 2013 for U.S. Appl. No. 12/823,204, 26 pages.
Response to Office Action filed with the USPTO on Apr. 8, 2013 for U.S. Appl. No. 13/443,188, 23 pages.
Huneycutt, Chad et al,, "Software Caching using Dynamic Binary Rewriting for Ao Embedded Devices", In Proceedings of the International Conference on Parallel Processing, 2001, 6 pages.
Miller, Jason E. et al., "Flexicache: Software-based Instruction Caching for Embedded Processors", ASPLOS '06, Oct. 21-25, 2006, 33 pages.

* cited by examiner

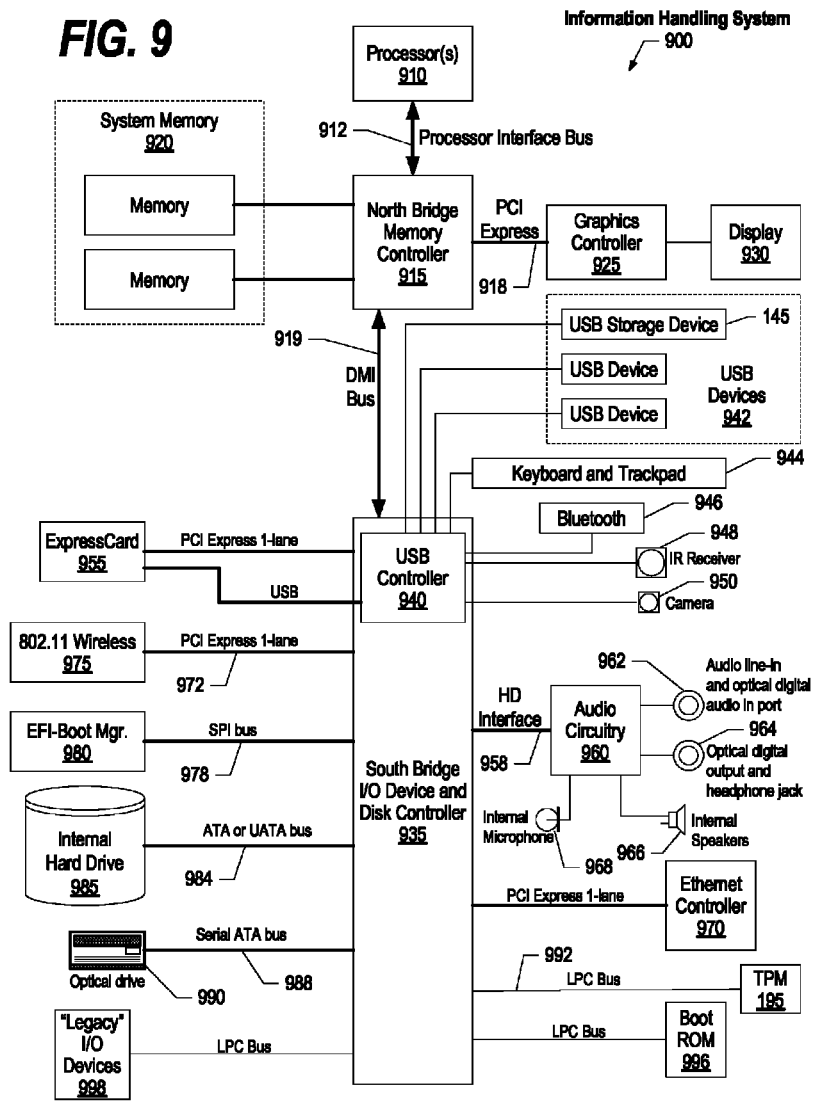

SPE SOFTWARE INSTRUCTION CACHE

BACKGROUND

Embedded processors often execute code stored in a private memory (e.g., local storage). Executing code larger than a processor's private memory requires a strategy for swapping pieces of code (code segments) into the private memory before use. In some cases, a code segment may include a branch instruction whose target instruction is located in a different code segment. Each time an instruction cache manager retrieves and stores code, the instruction cache manager identifies a location from which to retrieve the code in a backing storage area along with a location in an instruction cache area to store the code.

SUMMARY

A method, information handling system, and computer program product are disclosed that executes a direct branch instruction stored in an instruction cache line. Upon execution, the direct branch instruction branches to a branch descriptor, which includes a trampoline branch instruction and a target instruction space address. The trampoline branch instruction sends a branch descriptor pointer to an instruction cache manager that, in turn, extracts the target instruction space address from the branch descriptor and branches to a target instruction corresponding to the target instruction space address.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 9 illustrates information handling system 900, which is another embodiment of a simplified example of a computer system capable of performing the computing operations described herein.

DETAILED DESCRIPTION

Figure 1:
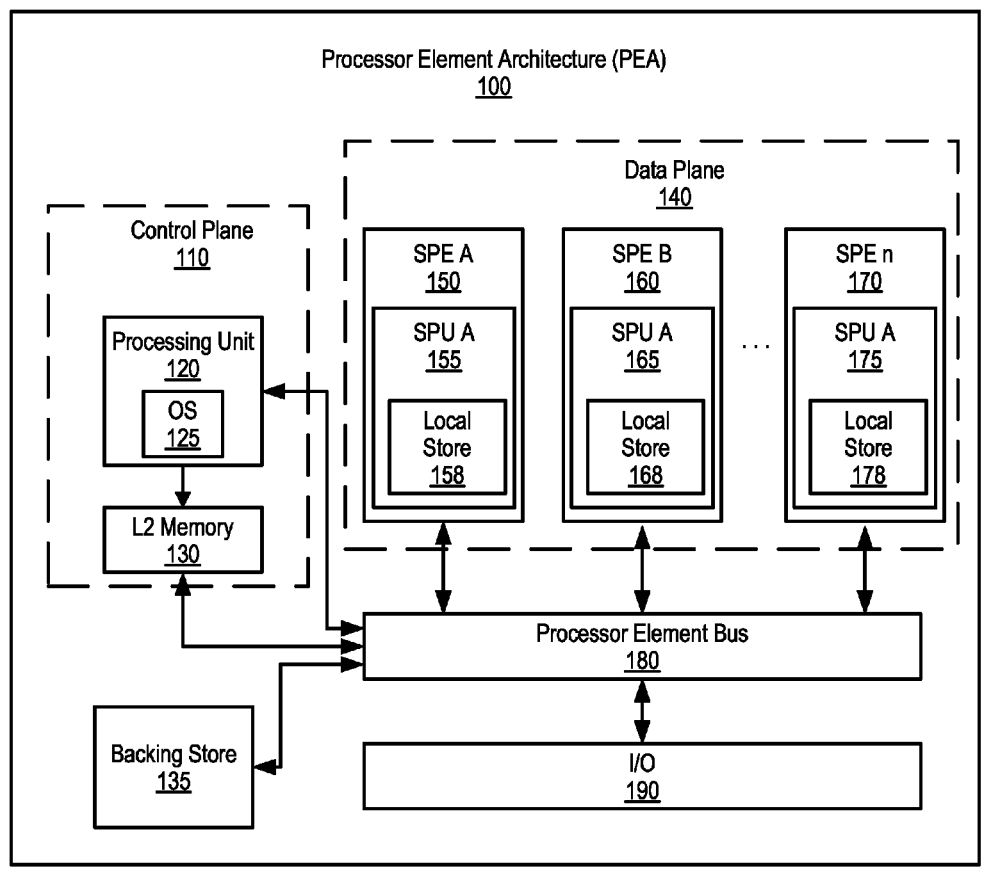
FIG. 1 is an embodiment of an information handling system capable of performing the computing operations described herein.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

A system, method, and program product are disclosed that utilize local storage address space semantics within a synergistic processing unit (SPU) for swapping pieces of instruction code into the local storage before execution. For each direct branch instruction, the instruction code includes a "branch descriptor" that includes a trampoline branch instruction. When called, the trampoline branch sends a branch descriptor pointer to an instruction cache manager that, in turn, extracts a target instruction space address from the branch descriptor, and branches to a target instruction corresponding to the target instruction space address accordingly.

FIG. 1 is an embodiment of an information handling system capable of performing the computing operations described herein. Processor element architecture (100) includes multiple heterogeneous processors that share a common memory and a common bus. Processor element architecture (PEA) 100 sends and receives information to/from external devices through input output 190, and distributes the information to control plane 110 and data plane 140 using processor element bus 180. Control plane 110 manages PEA 100 and distributes work to data plane 140.

Control plane 110 includes processing unit 120, which runs operating system (OS) 125. For example, processing unit 120 may be a Power PC core that is embedded in PEA 100 and OS 125 may be a Linux operating system. Processing unit 120 manages a common memory map table for PEA 100. The memory map table corresponds to memory locations included in PEA 100, such as L2 memory 130 as well as non-private memory included in data plane 140.

Data plane 140 includes Synergistic Processing Elements (SPE) 150, 160, and 170. Each SPE processes data information and each SPE may have different instruction sets. For example, PEA 100 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPUs 155, 165, 175), which is a processing core, such as a digital signal processor, a microcontroller, a microprocessor, or a combination of these cores. Each SPU includes a local storage area (local stores 158, 168, and 178), which may be segmented into private and non-private memory. Each of local stores 158, 168, and 178 store a cache directory and tag directory (instruction and/or data), along with a cache manager (see FIG. 2 and corresponding text for further details). And, each cache manager within each SPU manages their corresponding cache and retrieves data from backing store 135 accordingly.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory (see FIG. 9 and corresponding text for another embodiment of an information handling system for performing compilation functions as described herein).

Figure 2:
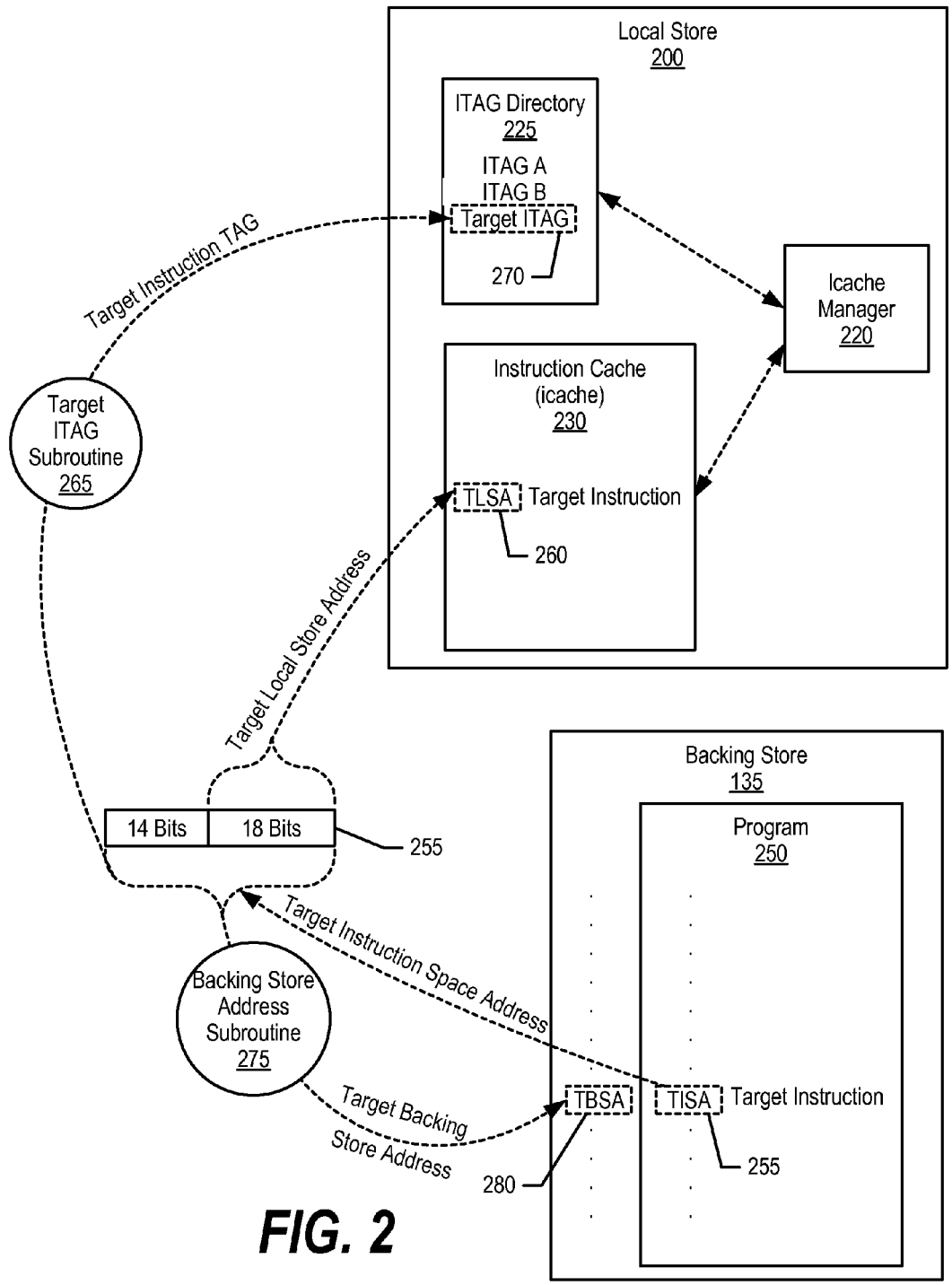
FIG. 2 is a diagram showing embodiments of an instruction cache (icache) manager translating a target instruction space address to other types of instruction addresses.

FIG. 2 is a diagram showing embodiments of an instruction cache (icache) manager translating a target instruction space address to other types of instruction addresses. Local store 200 resides within a synergistic processing unit (e.g., SPU's 155, 165, or 175) and includes instruction cache (icache) manager 220, instruction tag (ITAG) directory 225, and instruction cache 230.

In order to effectively move instructions from backing store 135 to icache 230, icache manager 220 requires an effective address within backing store 135 that corresponds to the location of the target instruction (target backing store address 280), as well as a local storage address within icache 230 to store the instruction (target local store address 260). In addition, icache manager 220 requires an instruction tag that corresponds to the target instruction in order to utilize ITAG directory 225 and determine a cache hit or a cache miss (target ITAG 270). As discussed herein, icache manager 220 uses an instruction's "instruction space address" (target instruction space address 255) to compute an instruction's target backing store address, target local store address, and target ITAG. The instruction space address is an address given to an instruction at link/load time based upon the location of the instruction in a program (program 250).

When icache manager 220 is requested (by an application thread) to branch to a particular target instruction, icache manager 220 determines whether the target instruction already resides in icache 230 by checking whether the target instruction's corresponding instruction tag (ITAG) is located in ITAG directory 225 (target ITAG 270). In order to generate target ITAG 270, icache manager 220 uses target ITAG subroutine 265, which generates target ITAG 270 using target instruction space address 255 and a tag array mask (see FIG. 8B and corresponding text for further details).

When icache manager 200 needs to load the target instruction from backing store 135 into icache 230, icache manager 220 computes the location of the target instruction in backing store 135 (target backing store address 280) as well as the location to store the target instruction in icache 230 (target local store address 260). Icache manager 220 utilizes target instruction space address 255 to generate these addresses as discussed below.

In the example shown in FIG. 2, target instruction space address 255 is 32 bits. Target instruction space address 255's 18 least significant bits, however, is target local store address 260 because local store 200 is 256 KB in size and only requires 18 bits for addressing into icache 230. As such, icache manager 220 masks off target instruction space address 255's 14 most significant bits in order to generate target local store address 260 (see FIG. 8A and corresponding text for further details). As those skilled in the art can appreciate, more or less bits may be required for target local store address 260 based upon the size of local store 200.

Figure 8A:
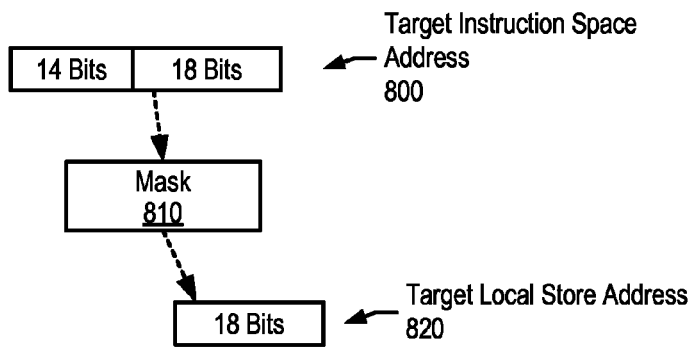
FIG. 8A shows a target instruction space address translated into a target local store address.
Figure 8B:
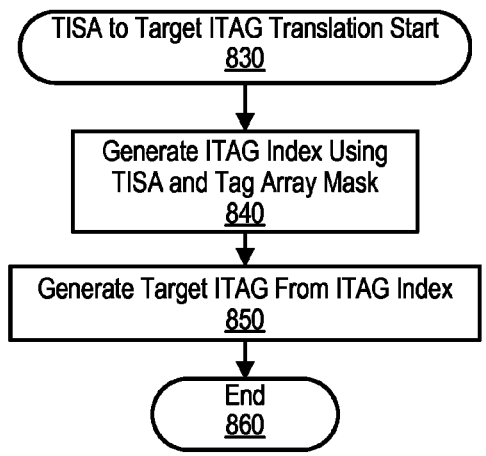
FIG. 8B is a flowchart showing steps taken in an icache manager translating a target instruction space address to a target instruction tag (ITAG)
Figure 8C:
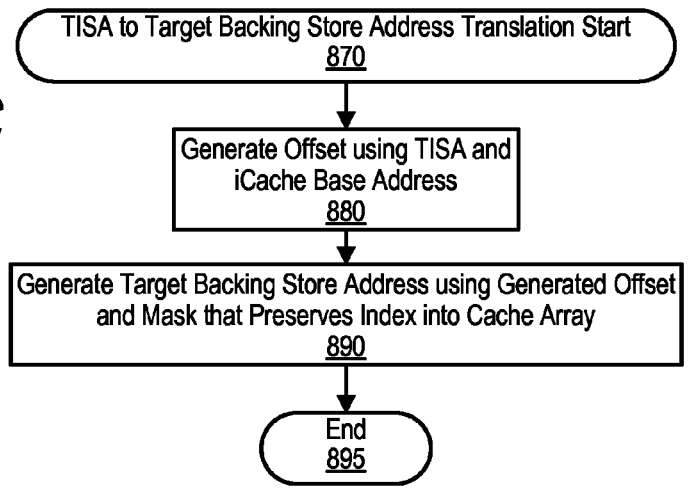
FIG. 8C is a flowchart showing steps taken in an icache manager translating a target instruction space address to a target backing store address.

In order to identify the location in backing store 135 to retrieve the instruction (target backing store address 280), icache manager 220 uses backing store subroutine 275, which generates an offset using target instruction space address 255 and an icache base address, and uses the offset and a mask to generate target backing store address 280 (see FIG. 8C and corresponding text for further details). In turn, icache manager 220 retrieves the target instruction from target backing store address 280; stores the target instruction in target local store address 260; and updates ITAG directory 225 accordingly.

Figure 3:
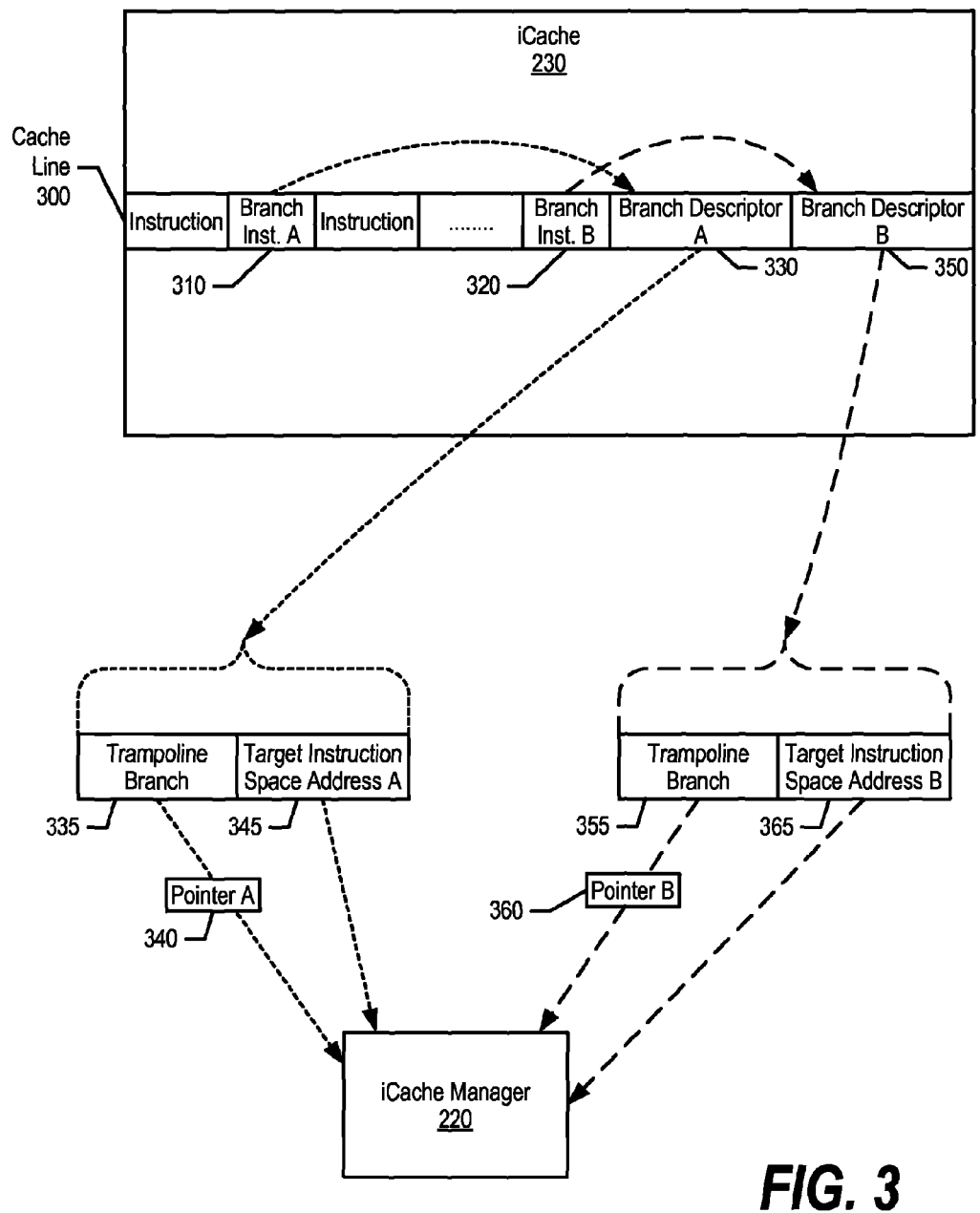
FIG. 3 is a diagram showing a cache line that includes direct branch instructions and corresponding branch descriptors.

FIG. 3 is a diagram showing a cache line that includes direct branch instructions and corresponding branch descriptors. One aspect of this disclosure is, during source compilation, a compiler adds a "branch descriptor" into a program for each direct branch instruction and, in turn, an icache manager loads the branch descriptors into the same instruction cache line during runtime execution. FIG. 3 shows instruction cache 230, which includes cache line 300. Cache line 300 includes multiple instructions, some of which are direct branch instructions 310 and 320. Cache line 300 also includes branch descriptors 330 and 350, which correspond to direct branch instructions 310 and 320, respectively.

When an application thread executes direct branch instruction 310, direct branch instruction 310 branches to branch descriptor 330. Branch descriptor 330 includes trampoline branch instruction 335 and target instruction space address 345. A trampoline branch is an instruction that, when executed, branches to, or "bounces" to icache manager 220, thus causing a trampoline effect. When branch instruction 310 branches to branch descriptor 330, trampoline branch instruction 335 is invoked, which branches to icache manager 220 and loads pointer 340 into a link register via a branch and set link instruction, which points back to branch descriptor 330. In turn, icache manager 220 uses pointer 340 to locate branch descriptor 330 and retrieve target instruction space address 345. Icache manager 220 uses target instruction space address 345 to generate various addresses and locate a target instruction corresponding to direct branch instruction 310 (see FIG. 5 and corresponding text for further details).

Likewise, when the application thread executes direct branch instruction 320, the branch instruction branches to branch descriptor 350, which is different than branch descriptor 330. Branch descriptor 350 includes trampoline branch instruction 355 and target instruction space address 365. Target instruction space address 365 corresponds to a location of the target instruction for branch instruction 320. When branch instruction 320 branches to branch descriptor 350, trampoline branch instruction 355 is invoked, which branches to icache manager 220 and loads pointer 360 into the link register via a branch and set link instruction, which points back to branch descriptor 350. In turn, icache manager 220 uses pointer 360 to locate branch descriptor 350 and retrieve target instruction space address 365.

Figure 4:
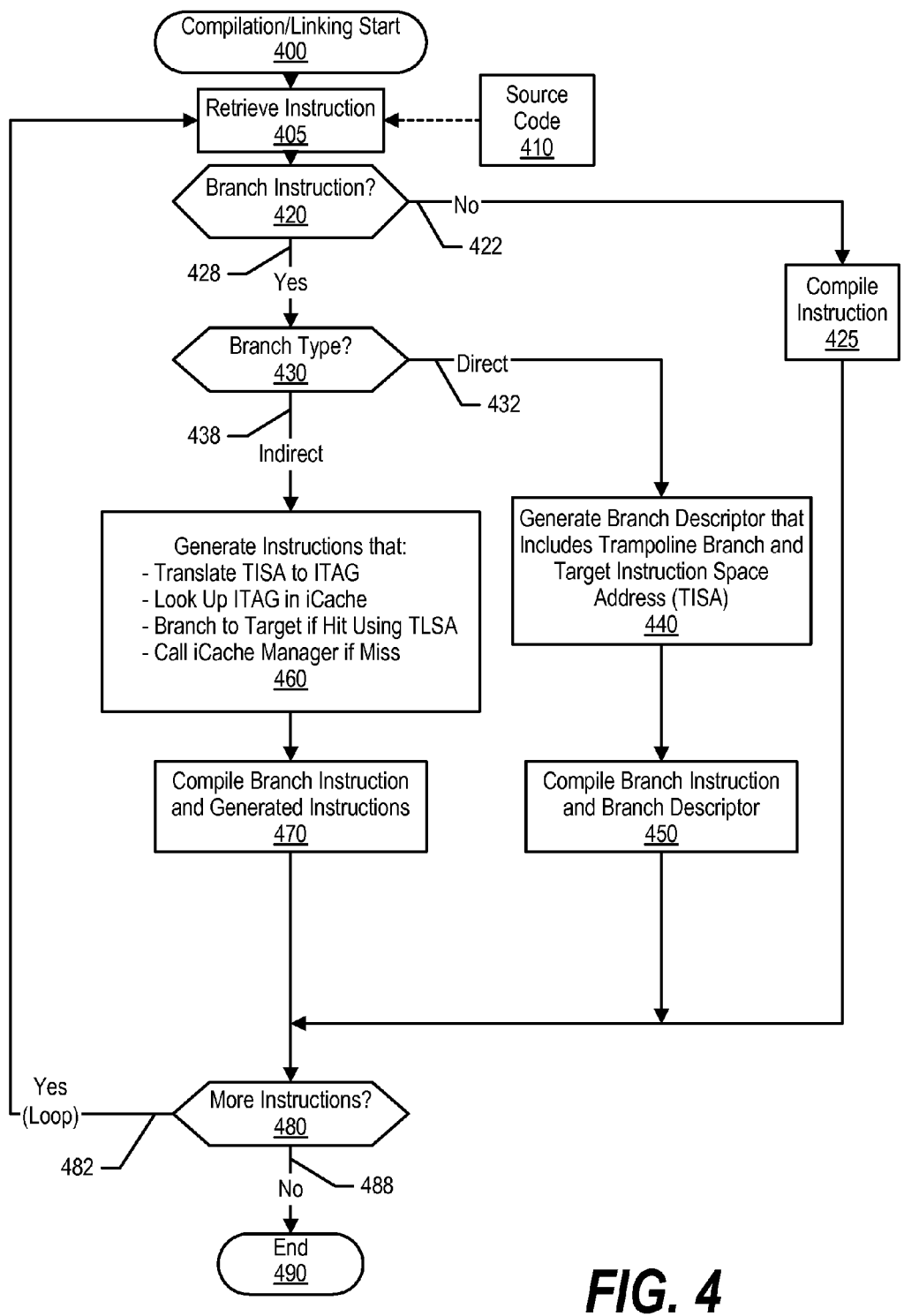
FIG. 4 is a flowchart showing steps taken in compiling various branch instruction types.

FIG. 4 is a flowchart showing steps taken in compiling various branch instruction types. The disclosure described herein includes embodiments discussing code compilation/linking, and embodiments discussing code execution (e.g., runtime environment). FIG. 4 shows steps taken by a compiler (and/or linker) when the compiler encounters a branch instruction while compiling source code.

Processing commences at 400, whereupon processing retrieves an instruction from source code 410 at step 405. A determination is made as to whether the retrieved instruction is a branch instruction (decision 420). If the instruction is not a branch instruction, decision 420 branches to "No" branch 422 whereupon processing compiles the instruction (step 425) in a traditional manner known to those skilled in the art.

On the other hand, if the retrieved instruction is a branch instruction, decision 420 branches to "Yes" branch 428, whereupon a determination is made as to the type of branch instruction (decision 430). If the instruction is a direct branch instruction, decision 430 branches to "Direct" branch 432 whereupon processing generates a branch descriptor that includes a trampoline branch instruction and a target instruction space address at step 440. During runtime execution, the direct branch instruction branches to the trampoline branch instruction, which sends a pointer to the icache manager and, in turn, the icache manager retrieves the target instruction space address from the branch descriptor (see FIGS. 3, 5, and corresponding text for further details). At step 450, processing compiles the branch instruction and branch descriptor.

If the branch type is an indirect branch, however, decision 430 branches to "Indirect" branch 438, whereupon processing generates a number of instructions (step 460) to handle the indirect branch during runtime execution. The instructions include an instruction to translate the indirect branch's target instruction space address to an instruction tag (ITAG) along with an instruction to look up the ITAG in an icache directory (icache directory 225 shown in FIG. 2). Processing also generates instructions in order to handle hit or miss outcomes of the lookup. For example, processing generates an instruction that translates the target instruction space address to a target local store address in order to branch to the instruction in icache if the lookup results in a cache hit, and also generates an instruction that calls the icache manager if the lookup results in a cache miss. At step 470, processing compiles the instructions.

A determination is made as to whether there are more instructions to process in source code 410 (decision 480). If there are more instructions to process, processing branches to "Yes" branch 482, which loops back to retrieve and process the next instruction. This looping continues until there are no more source code instruction to process, at which point decision 480 branches to "No" branch 488 whereupon processing ends at 490.

Figure 5:
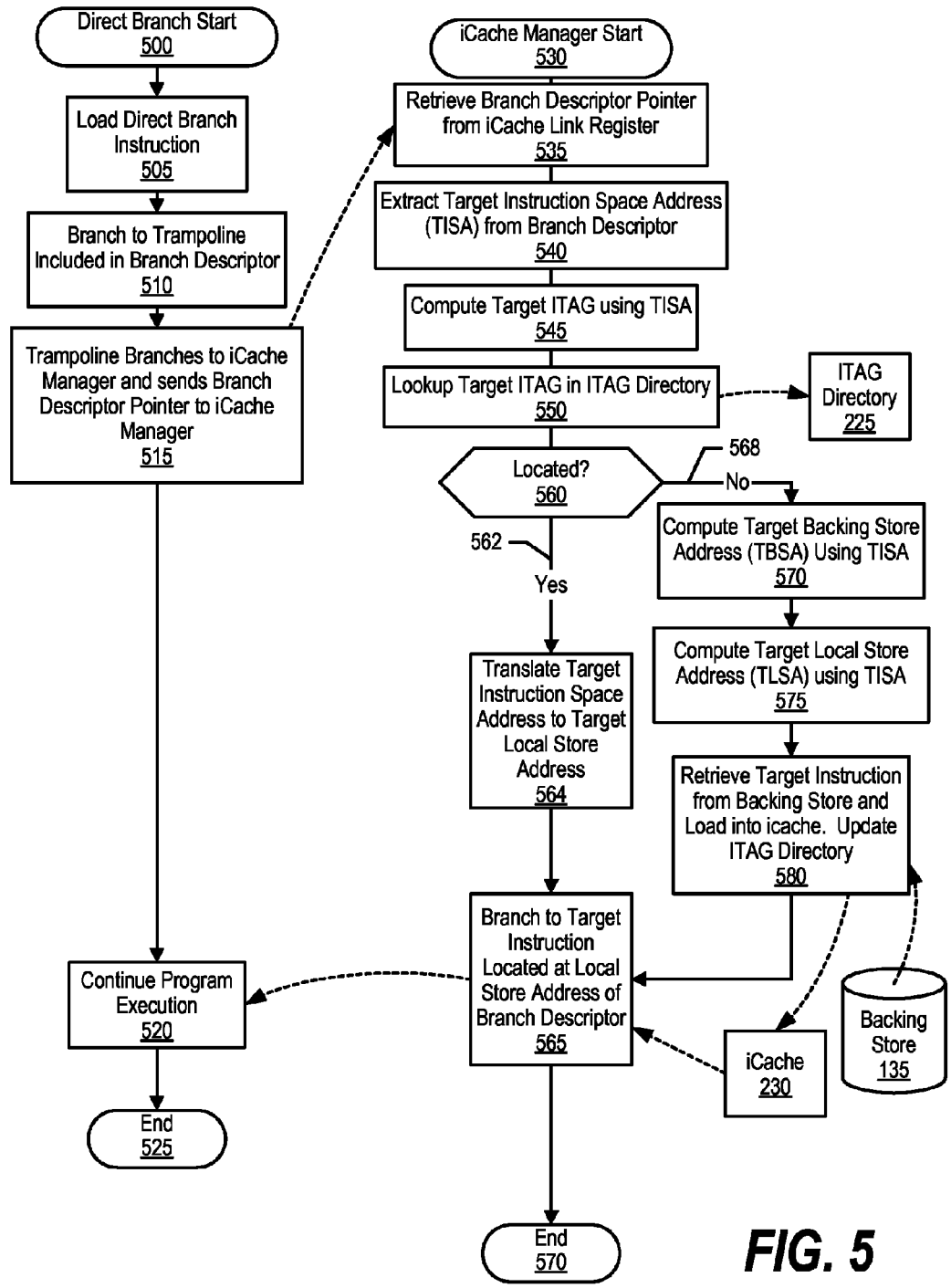
FIG. 5 is a flowchart showing steps taken in executing a direct branch instruction in a runtime environment.

FIG. 5 is a flowchart showing steps taken in executing a direct branch instruction in a runtime environment. The disclosure described herein inserts a branch descriptor into a cache line for each direct branch instruction (see FIG. 4 and corresponding text for further details). In turn, the branch descriptor includes information to pass onto an icache manager to process the direct branch instruction.

Processing commences at 500, whereupon processing (e.g., application thread) loads a direct branch instruction at step 505. The direct branch instruction was arranged at load time to branch to a trampoline branch instruction included in the direct branch's corresponding branch descriptor (see FIG. 3 and corresponding text for further details). As such, at step 510, processing branches to the trampoline branch instruction included in the corresponding branch descriptor. The trampoline branch instruction, at step 515, branches to the icache manager and sends a branch descriptor pointer to the icache manager (e.g., stores the branch descriptor pointer in an icache link register).

Icache manager processing commences at 530, whereupon the icache manager retrieves the branch descriptor pointer from the link register at step 535. At step 540, the icache manager uses the branch descriptor pointer to locate and extract the target instruction space address from the branch descriptor. The target instruction space address is an address that corresponds to the direct branch's target instruction.

At step 545, the icache manager computes a target ITAG from the target instruction space using a tag array mask (see FIG. 8B and corresponding text for further details). Next, the icache manager looks up the target ITAG in ITAG directory 225 in order to determine whether the target instruction is located in icache 230 (step 550).

A determination is made as to whether ITAG directory 225 includes the target ITAG (decision 560). If ITAG directory 225 includes the target ITAG (cache hit), decision 560 branches to "Yes" branch 562 whereupon the icache manager translates the target instruction space address to a target local store address at step 564 by masking off a portion of the target instruction space address (see FIG. 8A and corresponding text for further details). Then, at step 565, the icache manager branches to the target instruction located at the target local store address within icache 230; passes control back to the application thread; and ends at 570. The application thread continues program execution at step 520, and ends at 525.

On the other hand, if ITAG directory 225 fails to include the target ITAG (cache miss), decision 560 branches to "No" branch 568 whereupon processing computes a target backing store address from the target instruction space address using an offset and mask at step 570 (see FIG. 8C and corresponding text for further details). The target backing store address corresponds to the location of the target instruction stored in backing store 135. Next, the icache manager translates the target instruction space address to a target local store address at step 575 by masking off a portion of the target instruction space address (see FIG. 8A and corresponding text for further details). The target local store address is the location in icache 230 that the target instruction is stored. At step 580, the icache manager loads the target instruction from backing store 135 into icache 230. At this point, the icache manager branches to the target instruction located at the target local store address within icache 230 and passes control back to the application thread (step 565), which continues program execution at step 520. Icache manager processing ends at 570 and application thread processing ends at 525.

Figure 6:
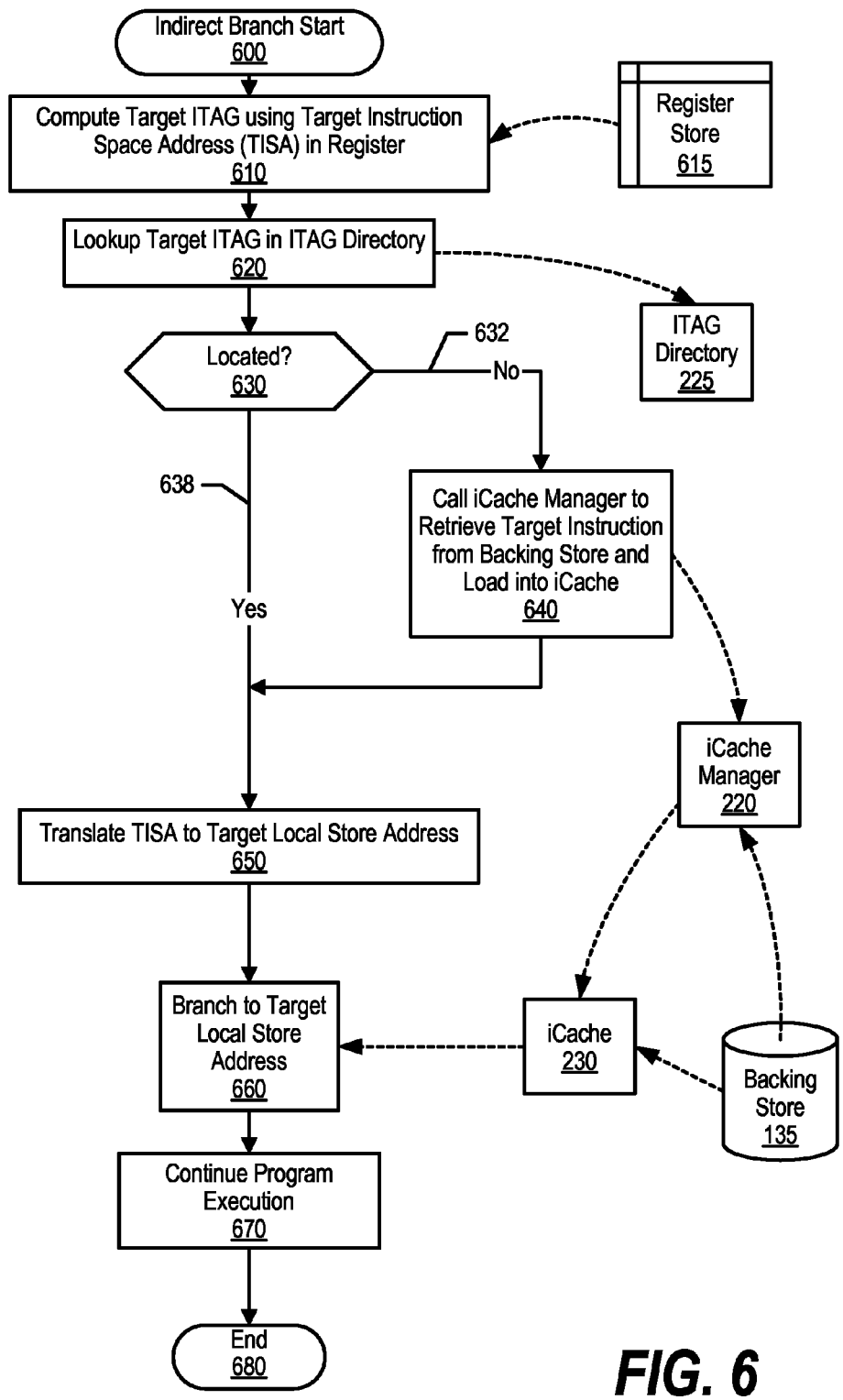
FIG. 6 is a flowchart showing steps taken in executing an indirect branch instruction in a runtime environment.

FIG. 6 is a flowchart showing steps taken in executing an indirect branch instruction in a runtime environment. Indirect branch processing commences at 600, whereupon processing (e.g., application thread) computes a target instruction tag (ITAG) using a target instruction space address located in register store 615 that corresponds to the indirect branch instruction's target instruction (step 610). The target instruction space address was stored in register store 615 from a previous instruction (hence an indirect branch instruction).

Processing looks up the target ITAG in ITAG directory 225 at step 620, and a determination is made as to whether the lookup results in a cache hit or a cache miss (decision 630). If a cache miss occurs, decision 630 branches to "No" branch 632, whereupon processing calls icache manager 220 to move the target instruction from backing store 135 into icache 230 (step 640). Icache manager 220, in turn, translates the target instruction space address to a target backing store address and a target local store address in order to move the target instruction from backing store 135 into icache 230 (see FIGS. 5, 8A, 8C, and corresponding text for further details). On the other hand, if a cache hit occurs, decision 630 branches to "Yes" branch 638, bypassing icache manager steps.

At step 650, processing translates the target instruction space address to the target local store address and, at step 660, processing retrieves the target instruction from icache 230 at the target local store address. Processing continues program execution at step 670, and ends at 680.

Figure 7:
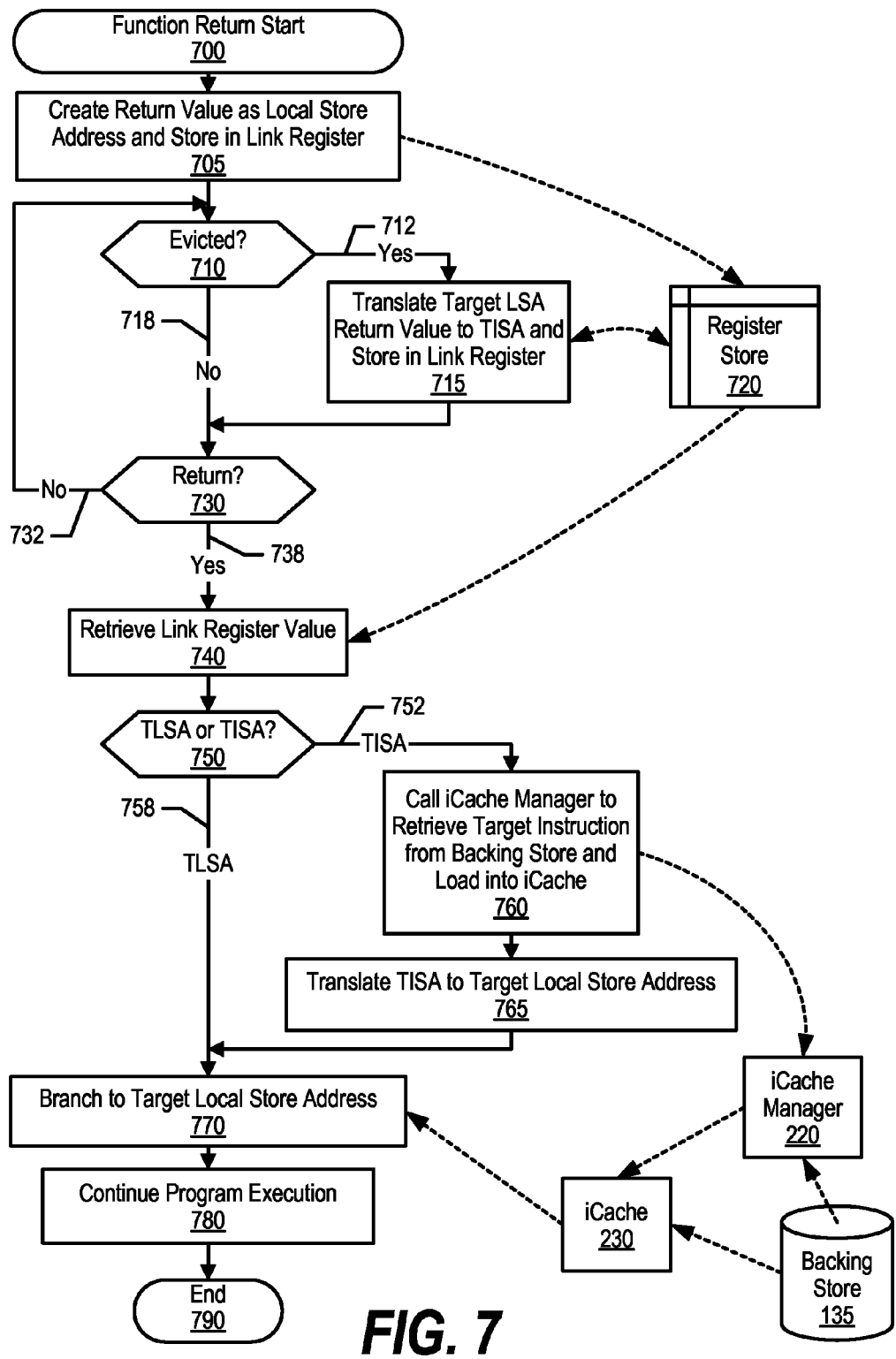
FIG. 7 is a flowchart showing steps taken in executing a function return instruction in a runtime environment.

FIG. 7 is a flowchart showing steps taken in executing a function return instruction in a runtime environment. Processing commences at 700, whereupon processing executes a function return instruction and, in doing so, creates a target local store address (icache address) as the return value, which is stored in a link register included in register store 720 (step 705).

While waiting for the instruction to finish, a determination is made as to whether the target instruction is being evicted from the icache (decision 710). If the target instruction address is being evicted from the icache, decision 710 branches to "Yes" branch 712, whereupon processing translates the target local store address to a target instruction space address and stores the target instruction space address in the link register at step 715. The target instruction space address is stored in the link register such that when the function return completes, processing realizes that the target instruction is no longer in icache 230 and should call the icache manager to move the target instruction from backing store 135 into icache 230 (discussed below). On the other hand, if the target instruction is not evicted from the icache, decision 710 branches to "No" branch 718 bypassing translation steps.

A determination is made as to whether the function return has completed (decision 730). If the function return has not yet completed, decision 730 branches to "No" branch 732, which loops back to monitor function return completion and target instruction eviction. This looping continues until the function return completes, at which point decision 730 branches to "Yes" branch 738 whereupon processing retrieves the link register value from register store 720 (step 740).

A determination is made as to whether the link register value is a target local store address (TLSA) or a target instruction space address (TISA) (decision 750). If the link register value is a target instruction space address, decision 750 branches to "TISA" branch 752, whereupon processing calls icache manager 220 to move the target instruction from backing store 135 into icache 230 (step 760). Icache manager 220, in turn, translates the target instruction space address to a target backing store address and a target local store address in order to move the target instruction from backing store 135 into icache 230 (see FIGS. 5, 8A, 8C, and corresponding text for further details). Processing, at step 765, converts the target instruction space address to the target local store address. On the other hand, if the link register value is a target local store address (e.g., target instruction was not evicted), decision 750 branches to "TLSA" branch 758 bypassing icache manager calling steps.

At step 770, processing branches to the target address at the target local store address and continues program execution at step 780. Processing ends at 790.

FIG. 8A shows a target instruction space address translated into a target local store address. The target instruction space address discussed herein includes 32 bits and the target local store address discussed herein includes 18 bits. As those skilled in the art can appreciate, more or less bits may be used for the target instruction space address and/or the target local store address. The target instruction space address includes the target local store address in its 18 least significant bits (see FIG. 2 and corresponding text for further details). As such, in order to translate the target instruction space address to the target local store address, the icache manager masks off target instruction space address 800's 14 most significant bits using mask 810, which leaves 18 least significant bits as target local store address 820.

FIG. 8B is a flowchart showing steps taken in an icache manager translating a target instruction space address to a target instruction tag (ITAG). Icache manager processing commences at 830, whereupon the icache manager generates an instruction tag index using the target instruction space address and a tag array mask (step 840). In one embodiment, a tag array is an array of structures with one element per cache line. Each element includes an instruction space address of a corresponding line that is currently resident. As such, in this embodiment:

tag array mask=Number of cache lines−1

ITAG index=(TISA/linesize)& tag mask

Next, at step 850, the icache manager generates the target instruction tag at step 850 from the generated ITAG index, such as by using the instruction:

Target ITAG=tag[ITAG index]

The icache manager may then use the target ITAG to look in the ITAG directory and determine whether a corresponding target instruction is located in the icache or whether the icache manager should retrieve the target instruction from backing store and load it into the icache. Processing ends at 860

FIG. 8C is a flowchart showing steps taken in an icache manager translating a target instruction space address to a target backing store address. Icache manager processing commences at 870, whereupon the icache manager generates an offset using the target instruction space address (TISA) and icache base address (step 880), such as with the instruction:

offset=(TISA−*i*cachebase)

Next, at step 890, the icache manager generates the target backing store address (TBSA) using the generated offset and mask that preserves an index into a cache array, such as with the instruction:

TBSA=(offset&mask that preserves idx into cache array)|(offset>>(18−log 2 *i*cachesize))

where "&" is a bitwise AND operator; "|" is a bitwise OR operator; and ">>" is a bitwise right shift. The icache manager may then use the target backing store address to retrieve the target instruction from backing store at the target backing store address, and load the target instruction into the icache (see FIGS. 5-7 and corresponding text for further details). Processing ends at 895.

FIG. 9 illustrates information handling system 900, which is another embodiment of a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A method comprising:
    compiling, by a compiler, source code, wherein, during compilation of the source code:
        in response to encountering an indirect branch instruction in the source code, inserting a set of instruction tag (ITAG) based instructions for generating an ITAG for the indirect branch and performing a lookup operation in an instruction cache directory, into compiled code corresponding to the source code, and
        in response to encountering a direct branch instruction, the compiler inserts into the compiled code, a branch descriptor comprising a target instruction space address and a trampoline instruction for redirecting execution to an instruction cache manager for translating the target instruction space address, and
        wherein branch descriptors and trampoline instructions are inserted by the compiler only for direct branches;
    executing the direct branch instruction, located in an instruction cache line, the execution resulting in branching to the branch descriptor that is located in the instruction cache line;
    in response to branching to the branch descriptor, executing the trampoline branch instruction that sends a branch descriptor pointer to an instruction cache manager, wherein the branch descriptor pointer points back to the branch descriptor;
    extracting, by the instruction cache manager, the target instruction space address from the branch descriptor; and
    executing a target instruction corresponding to the target instruction space address.

2. The method of claim 1 further comprising:
    generating a target local store address by masking off a portion of bits included in the target instruction space address; and
    branching to the target instruction located at the target local store address.

3. The method of claim 2 wherein the target local store address is located within an instruction cache.

4. The method of claim 3 further comprising:
    determining that the target instruction is not located at the target local store address;
    generating a target backing store address from the target instruction space address, the target backing store address corresponding to a location within a backing store area;
    retrieving the target instruction from the target backing store address; and
    storing the target instruction in the instruction cache at the target local store address.

5. The method of claim 4 wherein determining that the target instruction is not located at the target local store address further comprises:
    generating a target instruction tag from the target instruction space address; and
    checking whether the instruction tag is located in an instruction tag directory.

6. The method of claim 3 wherein the target instruction space address includes 32 bits, and wherein 14 most significant bits of the 32 bits are masked off, and 18 least significant bits of the 32 bits are maintained as the target local store address.

7. The method of claim 1, wherein compiling the source code comprises:
   retrieving a source code instruction from a source code file;
   determining that the source code instruction is a direct branch instruction; and
   creating the branch descriptor in response to determining that the source code instruction is a direct branch instruction.

8. An information handling system comprising:
   one or more processors;
   a memory accessible by at least one of the processors;
   a nonvolatile storage area accessible by at least one of the processors;
   a set of instructions stored in the memory and executed by at least one of the processors in order to perform actions of:
      compiling, by a compiler, source code, wherein, during compilation of the source code:
         in response to encountering an indirect branch instruction in the source code, inserting a set of instruction tag (ITAG) based instructions for generating an ITAG for the indirect branch and performing a lookup operation in an instruction cache directory, into compiled code corresponding to the source code, and
         in response to encountering a direct branch instruction, the compiler inserts into the compiled code, a branch descriptor comprising a target instruction space address and a trampoline instruction for redirecting execution to an instruction cache manager for translating the target instruction space address, and
         wherein branch descriptors and trampoline instructions are inserted by the compiler only for direct branches;
      executing a direct branch instruction stored in an instruction cache line, the direct branch instruction branching to a branch descriptor that is stored in the instruction cache line, the branch descriptor including a trampoline branch instruction and a target instruction space address;
      executing the trampoline branch instruction that sends a branch descriptor pointer to an instruction cache manager, wherein the branch descriptor pointer points back to the branch descriptor;
      extracting, by the instruction cache manager, the target instruction space address from the branch descriptor; and
      executing a target instruction corresponding to the target instruction space address.

9. The information handling system of claim 8 wherein the information handling system further performs actions that include:
   generating a target local store address by masking off a portion of bits included in the target instruction space address; and
   branching to the target instruction located at the target local store address.

10. The information handling system of claim 9 wherein the target local store address is located within an instruction cache.

11. The information handling system of claim 10 wherein the information handling system further performs actions that include:
   determining that the target instruction is not located at the target local store address;
   generating a target backing store address from the target instruction space address, the target backing store address corresponding to a location within a backing store area;
   retrieving the target instruction from the target backing store address; and
   storing the target instruction in the instruction cache at the target local store address.

12. The information handling system of claim 11 wherein the information handling system further performs actions that include:
   generating a target instruction tag from the target instruction space address; and
   checking whether the instruction tag is located in an instruction tag directory.

13. The information handling system of claim 10 wherein the target instruction space address includes 32 bits, and wherein 14 most significant bits of the 32 bits are masked off, and 18 least significant bits of the 32 bits are maintained as the target local store address.

14. The information handling system of claim 8 wherein the information handling system, when compiling the source code, further performs actions that include:
   retrieving a source code instruction from a source code file;
   determining that the source code instruction is a direct branch instruction; and
   creating the branch descriptor in response to determining that the source code instruction is a direct branch instruction.

15. A computer program product stored in a non-transitory computer readable medium, comprising functional descriptive material that, when executed by an information handling system, causes the information handling system to perform actions that include:
   compiling, by a compiler, source code, wherein, during compilation of the source code:
      in response to encountering an indirect branch instruction in the source code, inserting a set of instruction tag (ITAG) based instructions for generating an ITAG for the indirect branch and performing a lookup operation in an instruction cache directory, into compiled code corresponding to the source code, and
      in response to encountering a direct branch instruction, the compiler inserts into the compiled code, a branch descriptor comprising a target instruction space address and a trampoline instruction for redirecting execution to an instruction cache manager for translating the target instruction space address, and
      wherein branch descriptors and trampoline instructions are inserted by the compiler only for direct branches;
   executing a direct branch instruction stored in an instruction cache line, the direct branch instruction branching to a branch descriptor that is stored in the instruction cache line, the branch descriptor including a trampoline branch instruction and a target instruction space address;
   executing the trampoline branch instruction that sends a branch descriptor pointer to an instruction cache manager, wherein the branch descriptor pointer points back to the branch descriptor;
   extracting, by the instruction cache manager, the target instruction space address from the branch descriptor; and
   executing a target instruction corresponding to the target instruction space address.

16. The computer program product of claim 15 wherein the information handling system further performs actions that include:

generating a target local store address by masking off a portion of bits included in the target instruction space address; and branching to the target instruction located at the target local store address, the target local store address located within an instruction cache.

17. The computer program product of claim 16 wherein the information handling system further performs actions that include:

determining that the target instruction is not located at the target local store address;

generating a target backing store address from the target instruction space address, the target backing store address corresponding to a location within a backing store area;

retrieving the target instruction from the target backing store address; and storing the target instruction in the instruction cache at the target local store address.

18. The computer program product of claim 16 wherein the information handling system further performs actions that include:

generating a target instruction tag from the target instruction space address; and checking whether the instruction tag is located in an instruction tag directory.

19. The computer program product of claim 15 wherein the information handling system, when compiling the source code, further performs actions that include:

retrieving a source code instruction from a source code file;

determining that the source code instruction is a direct branch instruction; and creating the branch descriptor in response to determining that the source code instruction is a direct branch instruction.

* * * * *